United States Patent [19]

Low et al.

[11] 3,931,132

[45] Jan. 6, 1976

[54] UTILIZATION OF OXYGEN DIFLUORIDE FOR SYNTHESES OF FLUOROPOLYMERS

[76] Inventors: George M. Low, Deputy Administrator of the National Aernautics and Space Administration, with respect to an invention of; Madeline S. Toy, Orange, Calif.

[22] Filed: June 11, 1970

[21] Appl. No.: 45,549

[52] U.S. Cl. ............... 260/92.1; 260/879; 260/900
[51] Int. Cl.$^2$ ................... C08F 114/00; C08L 9/00; C08L 27/12
[58] Field of Search .................... 260/92.1 R, 92.1 S

[56] References Cited
UNITED STATES PATENTS

| | | | |
|---|---|---|---|
| 2,757,167 | 7/1956 | Cook | 260/92.1 |
| 3,309,348 | 3/1967 | Wentz | 260/92.1 |

Primary Examiner—Joseph L. Schofer
Assistant Examiner—Herbert J. Lilling
Attorney, Agent, or Firm—Monte F. Mott; G. T. McCoy; John R. Manning

[57] ABSTRACT

Oxygen difluoride, OF$_2$, is reacted with ethylenically unsaturated fluorocarbon compounds. Depending upon the fluorocarbon material and reaction conditions, OF$_2$ can chain extend fluoropolyenes, convert functional perfluorovinyl groups to acyl fluoride and/or epoxide groups and act as a monomer for an addition type copolymerization with diolefins.

6 Claims, No Drawings

UTILIZATION OF OXYGEN DIFLUORIDE FOR SYNTHESES OF FLUOROPOLYMERS

ORIGIN OF THE INVENTION

The invention described herein was made in the performance of work under a NASA contract and is subject to the provisions of Section 305 of the National Aeronautics and Space Act of 1958, Public Law 83-568 (73 Stat. 435; 42 USC 2457).

BACKGROUND OF THE INVENTION

1. Field of the Invention

This invention is in the field of new fluorocarbon compounds and method of making same. More particularly, the invention relates to the utilization of oxygen fluorides for the synthesis of new fluoropolymers, fluoromonomers and additional organic fluorine containing compounds.

2. Description of the Prior Art

Fluorinated hydrocarbon polymers, particularly those containing a high-fluorine content, such as perfluorinated materials, are of increasing interest. Because of high fluorine content the polymers tend to possess excellent thermal stability as well as having high chemical resistance and low temperature properties. To date, many processes for formulating fluorinated polymers are complex and often involve severe reaction conditions of temperature and pressure. Of particular interest because of its availability is perfluorobutadiene utilized as a starting monomer material. For example, in copending application Ser. No. 848,351 filed Aug. 7, 1969, now abandoned, there is disclosed a new process for low temperature and pressure polymerization of that material in the presence of certain free radical catalysts. However, there has been little additional effort in the prior art directed to utilizing this material and other similar fluorocarbon monomers to form graft polymers, linear addition polymers and further new fluorocarbon polymeric materials under relatively mild reaction conditions.

As will be described, oxygen difluoride is utilized in the herein invention as a major reactant. This material has been well known as a powerful fluorinating agent requiring more energy of activation than is needed for elemental fluorine. In addition to its fluorine-like reactions $OF_2$ has been reported to form products resulting from simple $OF_2$ addition to a substrate, such as addition to $SO_2$ and $SO_3$. Additionally, $OF_2$ has been reacted with carbonyl fluoride and was reported to produce bis(trifluoromethyl)trioxide through a polar mechanism.

SUMMARY OF THE INVENTION

Thus, an object of this invention is to provide new fluorinated polymer materials.

Another object of this invention is to provide a means for obtaining graft copolymerizations, chain extensions, and addition copolymerizations for fluorine-containing monomers and polymeric materials.

A still further object of this invention is to provide a means for modifying terminal and pendant perfluorovinyl groups of fluoropolymers to introduce functional groups.

The above and other objects of this invention are obtained through the utilization of $OF_2$ as a difunctional reagent for reactions with various fluorine containing polymers, monomers and other compounds.

According to the starting materials and the reaction condition, various novel products can be formed utilizing $OF_2$. Basically, there are three types of reactions involved. These include: (1) chain extension of fluoropolyenes, (2) insertion of acyl fluoride groups or epoxide groups or both into fluoromonomers or polymers containing perfluorovinyl groups, and (3) addition type copolymerization between $OF_2$ as a monomer and a fluorodiene. The chain extension of fluoropolyenes is in accord with the following general formula:

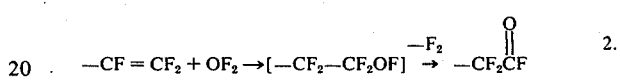

1.

As can be seen, this chain extension in effect produces an ether formation. When the aforegoing reaction is carried out at higher temperatures acyl fluoride groups are formed in accord with the following reaction:

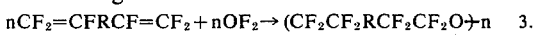

2.

The acyl fluoride groups formed in the above general reaction are functional groups which provide sites for grafting materials to polymers. Finally, addition type copolymerization between diolefins can occur in accord with the general reaction:

$$nCF_2=CFRCF=CF_2 + nOF_2 \rightarrow (CF_2CF_2RCF_2CF_2O)_n \quad 3.$$

where R can be any divalent organic radical which remains stable under reaction conditions and can, for example, contain 1 to at least 100 C atoms. Thus, R can be alkylene, arylene, alkyarylene, alkenylene, aralkylene and the like. Preferably, R is perfluorinated.

As with Reaction 1 above, it can be seen that ether linkages are provided. However, since the diolefins are utilized as starting monomer materials for copolymerization, a resulting long chain linear polymer can be formed which can be terminated with acyl fluoride groups particularly when conducted at higher temperature conditions in accord with Reaction 2 above. Thus, it can be seen that as pointed out, reaction temperature appears to be an important control upon the formation of acyl fluoride groups.

By controlling reaction temperatures below 0°C, Reaction 1 above can generally be obtained where chain extension of the polymer is achieved without the formation of the acyl fluoride or epoxide group. As temperature is increased above 0°C, the acyl fluoride and epoxide groups begin to appear in the reaction products. As reaction temperature is increased to ambient temperature, above 25°C, essentially only acyl fluoride groups are present. Thus, as can be seen, new materials are thus formed in accord with the invention which include the type of chain-extended ether-containing material of Reaction 1, the polymer material of Reaction 3 and the acyl-terminated polymer of the same type.

In one particularly novel aspect of the herein invention, it has been found that an acyl fluoride containing polyperfluoro-1,2-and 1,4-butadiene formed in accord with Reaction 2 above, can be converted to carboxyl polyperfluorobutadiene having the general formula:

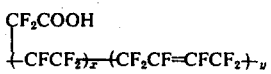

where $x$ and $y$ are positive integers

This material has been found to bond surface untreated polytetrafluoroethylene. The polyperfluoro-1,2-and 1,4-butadiene and its method of manufacture is disclosed in copending application Ser. No. 848,325, filed Aug. 7, 1969 now abandoned. It is believed that the invention will be better understood from the following detailed description and specific examples.

DESCRIPTION OF THE PREFERRED EMBODIMENTS

The herein invention is based upon the discovered reaction between $OF_2$ and a perfluorovinyl group which has the formula $-CF=CF_2$. At temperatures under 0°C, the reaction between $OF_2$ and the perfluorovinyl group will form the following group:

$$-CF_2-CF_2OF$$

Thus, as can be seen from the above formula, if a single perfluorovinyl group is present in a monomer or a polymer, a chain extension can readily occur producing an ether linkage between the two monomers or polymers containing the perfluorovinyl groupings. If the polymers or monomers involved contain two perfluorovinyl groups, then an addition type copolymerization can occur, once again having ether linkages.

As the temperature of reaction increases above 0°C, an acyl fluoride group having the formula, $$-CF_2\overset{O}{\overset{\|}{C}}F,$$

and epoxide groups having the formula, $$-CF-CF_2,$$
$$\diagdown\diagup$$
$$O$$

occur. As the temperature approaches ambient and above, only acyl fluoride groups are present.

In the reaction to form the acyl fluoride grouping, a transition state of a hypofluorite or fluoroxy group ($-OF$) is initially formed. Upon liberation of $F_2$ from the $-CF_2OF$, the acyl fluoride group is thus formed. It has been found that this serves as a useful mechanism to provide a free radical polymerization means to achieve a graft polymerization where there are additional unsaturated bonds present in the fluoropolymers.

Thus, for example, in one aspect of the herein invention, $OF_2$ can be reacted with a material such as polyperfluorobutadiene together with a monomer such as tetrafluoroethylene, whereby the liberation of the fluorine gas from hypofluorite sites will serve to promote a free radical graft polymerization of the tetrafluoroethylene onto the polyperfluorobutadiene at available double bonds present in the polymer chain. The following discussion will be broken down into the various types of reactions as described above that can occur utilizing $OF_2$.

CHAIN EXTENSION

High molecular weight fluoropolymers are particularly desirable. In various prior art techniques extreme high pressure was required in order to obtain high molecular weight polyperfluorobutadiene. The maximum molecular weight obtainable in the prior art at low pressure was 10,000. Increased molecular weight of these materials provides for improved mechanical strength in elastomers as well as other desired properties. Thus, through the utilization of $OF_2$ under proper conditions, any perfluorinated polyperfluoropolyene can be extended provided that the polymers have a perfluorovinyl grouping, $-CF=CF_2$. A general reaction for the chain extension of the fluoropolyenes is given as Reaction 1 above.

As can be seen, it is to be noted that there must at least be a vinyl linkage at a terminal or pendant grouping of the polymer in order to get chain extension. Internal double bonds are not affected by the reaction.

One of the preferred starting materials to be utilized in the herein invention is polyperfluorobutadiene. Particularly preferred is polyperfluoro-1,2- and 1,4-butadiene having the general formula:

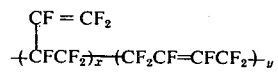

where $x$ and $y$ are as defined above.

The above material is described in U.S. patent application Ser. No. 848,325 now abandoned mentioned above and can be prepared by reacting perfluorobutadiene with diisopropyl peroxydicarbonate, bis(trifluoromethyl) peroxide and others. The chain extension of polyperfluoro-1,2- and 1,4-butadiene will proceed in accord with the following general reaction:

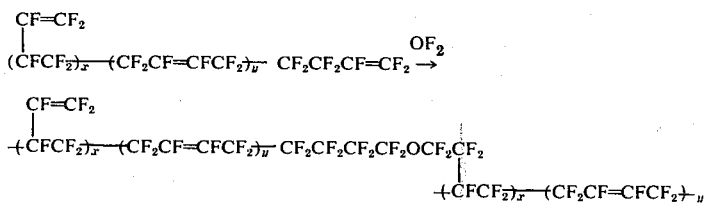
4.

The starting polymers which are chain extended, such as the polyperfluorobutadiene, are normally solid materials due to their molecular weight. As a result, when the reaction is carried out in a solid state, a very minimal amount of ether linkages are obtained since there is little mobility between the polymer groups and exposure of terminal perfluorovinyl groups.

$OF_2$ is an extremely reactive material and is easy to subject to explosion at ambient temperatures and above. It is thus preferred to utilize dilute concentrations of $OF_2$. Thus, in the process of this invention, $OF_2$ is diluted with a suitable inert gas such as helium and nitrogen and suspension or solution of material in inert solvent as Freon 113, or other similar materials. Typical mixtures include 50—50 volume percent of $OF_2$ and the dilutant gas.

The chain extension reaction is carried out at a temperature range from $-145°C$, which is the boiling point of $OF_2$, to up to 0°C. Preferably the reaction is carried out between $-100°C$ and 0°C. Over that temperature range, most of the polymers utilized will be solid, such as the polyperfluorobutadiene mentioned above. As temperature is increased above 0°C, the reaction will produce both a chain extension through ether linkages, and will additionally form acyl fluoride groups and epoxide groups. Generally, the presence of the acyl fluoride and epoxide groups will prevent chain extension. As will be pointed out subsequently, the presence of these groups, however, can be useful and thus the mixture of these groups together with some chain extension can be desirable as lower molecular weight products which are later cross-linkable are desired.

The reaction between the polymer and $OF_2$ can be carried out under either static or flow conditions. In either event, it is desirable to have an excess of $OF_2$ present over that stoichiometrically required to achieve the chain extension. The concentration of the $OF_2$ is normally reduced by adding a diluent gas such as helium or the like. The use of the inert gas serves to prevent possible explosion from occurring. The reaction can go to completion sooner under higher pressures. However, lower pressures are preferred because selective reactions are easier to control. The chain extension has been found to proceed satisfactorily at pressures as low as 1/6 atmosphere. It is preferred to maintain pressure at less than 3 atmospheres. Once the pressure condition is set, whether utilizing static or flow conditions of the $OF_2$, the completion of the reaction can be determined when the pressure no longer decreases during the reaction for static condition.

It is obviously desirable to maximize the contact between the $OF_2$ and the starting polymer material in order to obtain the chain extension. Thus, the polymer should provide as large a surface area contact for the $OF_2$ as possible. This can be achieved by contacting a plain polymer powder with $OF_2$. Additionally, the polymer powder can be dispersed in a liquid suspension of Freon 113 or Freon 11, or other suitable material such as fluorochemical FC-75 from the 3M Company. The $OF_2$ is then bubbled through the liquid dispersion or sealed with the liquid dispersion in a flask in a static condition. As a third alternative, the polymer can be at least partially dissolved in a suitable solvent such as polyperfluorobutadiene partially dissolved in hexafluorobenzene. The solution can be then rotated in a Dry Ice-acetone bath to freeze it. The solvent is then sublimed from the mixture which leaves the polymer in a very flufly dried state. This fluffy state significantly increases the surface area of contact of the polymer, thus utilizing a freeze-dried polymer for contact with $OF_2$ gas is highly desirable.

As indicated above, a particularly preferred starting material to be contacted with the $OF_2$ is polyperfluoro-1,2- and 1,4-butadiene. It has been found that the rate of reaction between the $OF_2$ and that butadiene is dependent upon the amount of either 1,2- or 1,4-butadiene present in the polymer. The reaction proceeds much faster with a higher percentage of the 1,2-butadiene since it appears that the double bond of the pendant group is more polar than internal double bonds.

It has additionally been found that the presence of catalysts or polymer initiators used in making the starting polymer such as the polyperfluorobutadiene, can affect the herein reaction with $OF_2$. Thus, it is preferred to utilize a gaseous catalyst to form the initial polymer, which gaseous catalyst does not remain in the final product. It is also preferred to use perfluoroalkyl peroxide. The reason for this is that catalysts and the initiator fractions attached to the polymers are subject to attack by the very reactive $OF_2$.

For example, a peroxide catalyst such as bis(trifluoromethyl) peroxide, $CF_3OOCF_3$, which is a gaseous catalyst not remaining in the final product and also when it attaches to a butadiene polymer when it is formed, will not be attacked by the $OF_2$. The initiator fraction $CF_3O$ attached to butadiene forming the stable perfluorinated ether linkages at end of polymer is stable to $OF_2$. However, initiators such as benzoyl peroxide and diisopropyl peroxydicarbonate form initiator fractions as

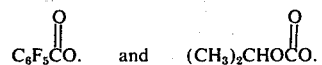

respectively which attach to polyperfluorobutadiene. These terminal ends will be very reactive in the presence of $OF_2$ to cause explosions.

By achieving the chain extension herein, as can be seen, ether linkages are added to the polymer. The starting polymer when, for example, the polyperfluorobutadiene described, is a hard elastomer. By adding ether linkages one can go from a hard elastomer material to a gum, even though the overall molecular weight increases. Further, the solubility of the polymer will increase even though the molecular weight increases from the chain extension of polyperfluorobutadiene. It would appear that the $OF_2$ affects the crystallinity and morphology of the polymer where it tends to become more gummy. For example, it has been found that when the chain extended polyperfluorobutadiene has a resulting molecular weight under 25,000, a gummy product results. Over 25,000, a hard product can be obtained. Thus, one can control the hardness of the resulting chain extended polymer by controlling the molecular weight as well as structure of the chain extended product.

It is also found that hardness of the product is not only affected by the final molecular weight, but also the molecular weight of the starting polymer. In other words, the chain-extended products of identical molecular weight vary in hardness due to the molecular weight of the starting polymer or the number of ether linkages added. To obtain a hard elastomer, a higher molecular weight starting polymer is used. For example, a molecular weight of about 15,000 is used. Additionally, the reaction time is increased between the temperatures of 0° to −20°C, as required. A gummy elastomer is obtainable using a lower molecular weight starting polymer of, for example, 5,000. The reaction time is then increased between the same temperatures of 0° to −20°C.

It should be pointed out that the plain polyperfluorobutadiene prior to treatment with the $OF_2$ is normally a hard elastomer-like material. By the chain extension method herein, where a gum-like product can be formed at lower molecular weights below 25,000, the polyperfluorobutadiene then can be used as a binder, adhesive, lubricant, and the like. The chain extended product can be further cross-linked to form a solid material for various elastomeric applications, or alternatively a higher-molecular weight chain extended product can be formed, above 25,000 molecular weight which is solid, and will have such elastomeric uses. It is believed that the following examples will further describe the chain extension utilizing $OF_2$:

EXAMPLE I

CHAIN EXTENSION OF POLYPERFLUOROBUTADIENE

In this example, a polyperfluoro-1,2- and 1,4-butadiene was used as a starting material. The butadiene was prepared in accord with the method disclosed in application Ser. No. 848,325. The polymer was prepared by mixing monomer with bis(trifluromethyl) peroxide and subjecting the perfluorobutadiene and catalyst to ultraviolet light exposure under a 275 Watt sunlamp. The particular polymer utilized had an intrinsic viscosity, [$\eta$] of 0.032 dl/g in hexafluorobenzene as solvent at 30.1°C, and a molecular weight of 7,800. The polyperfluorobutadiene was in a powder form, of which 5 grams was placed in a Pyrex pressure bottle. The pressure bottle was connected to a vacuum manifold system. 50 milliliters of anhydrous Freon 113 was condensed into the reaction vessel, during which a liquid nitrogen bath was placed around the vessel. The polymer was stirred in the Freon 113 with a magnetic stirrer after warming to ambient temperature until a polymer suspension was formed.

Oxygen fluoride which had passed through a sodium fluoride scrubber and contained in a receiver vessel was then admitted to the reaction vessel which was then exposed to the atmosphere through a soda-lime scrubber to remove $OF_2$. The flow of the $OF_2$ was controlled to about 1 bubble per second passing through the polymer suspension in the Freon 113. The bubbling continued for four hours at ambient temperature. At the end of the four hours, the reaction vessel was purged with helium to sweep out any oxygen difluoride. The Freon 113 was then removed by continued sweeping with helium at ambient temperature.

A colorless gum was then left in the reaction vessel, which was removed from the vacuum manifold and placed in a vacuum dessicator at 40° to 50°C overnight. This colorless gum product had an [$\eta$] 0.061 and a molecular weight of 20,000 in a quantitative yield. Infrared spectrum of the gum indicated the presence of C-F at 7.4 and 9.1 $\mu$, a perfluorovinyl group at 5.6 $\mu$, and a perfluorovinylene group at 5.8 $\mu$. Additionally, it had a characteristic peak of 5.3 $\mu$, indicating an acyl fluoride group which was not present in the spectrum of the starting material. The following Table I indicates the comparison of physical properties of the polyperfluorobutadiene before and after the exposure to the $OF_2$.

TABLE I

COMPARISON OF PHYSICAL DATA OF POLYPERFLUOROBUTADIENE BEFORE AND AFTER $OF_2$ EXPOSURE

|  | Polyperfluorobutadiene Batch No. 2 | Same Batch after $OF_2$ Exposure |
|---|---|---|
| Tm(°C) | 90–100 | 120–135 |
| [$\eta$] | 0.032 | 0.061 |
| $M_n$ | 7,800 | 20,000 |
| DP | 48 | 123 |

In the above Table:

Tm is the melting point of the product;

the solubility [$\eta$] was determined in hexafluorobenzene as solvent at 30.1°C;

$M_n$ is the average molecular weight; and

DP is the approximate number of repeating units in the polymer.

As can be seen from above Table I, there was a significant increase in molecular weight of almost three times, due to the chain extension utilizing $OF_2$, yet the product obtained from this chain extension was a gum as compared to a hard elastomeric-like solid starting polyperfluorobutadiene.

EXAMPLE II

FURTHER CHAIN EXTENSION OF PERFLUOROBUTADIENE WITH $OF_2$

A series of reactions between $OF_2$ and the polyperfluorobutadiene used in Example I were conducted to demonstrate the effect of various controlled reaction conditions. The same apparatus used in Example I was used for these series of runs. However, in some instances, the $OF_2$ was not bubbled through the suspension but introduced from the top above the freeze-dried solid. In the table, PPFB-1 is a polyperfluoro-1,2- and 1,4-butadiene which has a melting point of less than 50°C, a molecular weight about 2,000. PPFB-2 represents a polyperfluoro1,2- and 1,4-butadiene that has a melting point between 90° and 100°C, an intrinsic viscosity of 0.32 dl/g in hexafluorobenzene at 30.1°C, and molecular weight of 7,800. As can be seen the starting polyperfluorobutadiene was either in a suspension with Freon 113 or was a freeze-dried fluffy solid. The $OF_2$ was either flowed through a suspension of the polymer or sealed in the reaction vessel, either with the dried material or the suspension material which is indicated in the Table. The pressure conditions varied because of requirements to maintain a slight positive pressure to insure a positive flow without drawing the material back into the system. Further, and most importantly, the temperature conditions of the vessel varied widely to determine the effect of temperature on the reaction. Additionally, reaction times were varied. In some of the runs, as can be seen, 100% $OF_2$ was placed in the reaction vessel. In other runs, a 50—50 volume percent mixture of $OF_2$ and helium was utilized.

TABLE II

REACTIONS OF $OF_2$ WITH POLYPERFLUOROBUTADIENE

| Batch No. of Product | Starting Polymer | Conc., Flow or Static | $OF_2$ Pressure (atm.) | Temp (°C) | Time (hr) |
|---|---|---|---|---|---|
| 1 | Freeze-dried solid PPFB-1 | 100% $OF_2$ Static | 2 | 25 | 25 |
| 2 | " | 100% $OF_2$ Static | 2 | 50 | 1 |
| 3 | Freon 113- stirred | 100% $OF_2$ flow | 1 | 19 | 4 |

TABLE II-continued
REACTIONS OF $OF_2$ WITH POLYPERFLUOROBUTADIENE

| Batch No. of Product | Starting Polymer | Conc., Flow or Static | $OF_2$ Pressure (atm.) | Temp (°C) | Time (hr) |
|---|---|---|---|---|---|
| 4 | suspension of PPFB-1 " | 100% $OF_2$ flow | 2 | 25 | 168 |
| 5 | " | 50%$OF_2$-He flow | 1⅓ | 20 | 4 |
| 6 | Freeze-dried solid PPFB-1 | 100%$OF_2$ Static | 2 | 50 | 18 |
| 7 | Freon 113-stirred suspension of PPFB-1 | 50%$OF_2$-He | 1½ | 25 | 2 |
| 8 | Freon 113-stirred suspension of PPFB-2 | 100% $OF_2$ | 2 | 15 | 144 |
| 9 | " | 100% $OF_2$ flow | 2 | 15 | 4 |
| 10 | " | 50%$OF_2$-He flow | 1⅔ | 0 | 1 |
| 11 | " | 50%$OF_2$-He static | 1⅓ | 0 | 1 |
| 12 | " | 50%$OF_2$-He flow | 1⅓ | 20 | 4 |
| 13 | " | 50%OF-He flow | 1⅓ | 0 | 1 |

| Batch No. of Product | Relative Infrared Peaks | | | Product | | | |
|---|---|---|---|---|---|---|---|
| | 5.3μ Among $-CF_2-\overset{O}{\overset{\|}{C}}F$ | 5.6μ $-CF=CF_2$ | 5.8μ $-CF=CF-$ | Tm (°C) | $[\eta]$ dl/g | $M_n$ | DP |
| 1 | Strong | Medium | None | | | | |
| 2 | Strong | Medium | Weak | | | | |
| 3 | Strong | Medium | Weak | <30 | | | |
| 4 | Very Strong | Weak | None | <25 | 0.012 | 1,900 | 11 |
| 5 | Weak | Strong | Weak | 110-112 | 0.04 | 10,000 | 62 |
| 6 | Strong | Weak | None | 53-74 | | | |
| 7 | Weak | Strong | Medium | 97-106 | 0.017 | 3,300 | 20 |
| 8 | Medium | Strong | None | <25 | 0.0125 | 2,000 | 12 |
| 9 | Medium | Medium | Weak | 120-135 | 0.061 | 20,000 | 123 |
| 10 | None | Strong | Medium | 130-145 | >0.068 | >24,000 | >148 |
| 11 | None | Medium | Weak | 117-125 | 0.032 | 7,800 | 48 |
| 12 | Weak | Strong | Medium | 130-145 | | | |
| 13 | None | Strong | Weak | 127-147 | | | |

As can be seen from the above Table II, at higher temperatures there was greater production of acyl fluoride groups

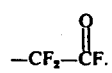

At the lower reaction temperatures of, for example, 0°, it can be seen that no acyl fluoride was formed while there was a strong presence of perfluorovinyl groups, $-CF=CF_2$. This indicates that a chain extension more likely and readily will occur at the lower temperatures since the acyl fluoride groups are not readily formed. It should be pointed out that it might be desirable for some applications to both chain extend and have acyl fluoride groups present in the polymer, since the acyl fluoride groups are susceptible to further cross-linking reactions when the material is to be used as a binder or other similar applications.

From the above Table II, various conclusions can be drawn as to the effect of reaction conditions upon the resulting product: At 0°C, no acyl fluoride groups are obtained, while chain extension occurs; (2) at temperatures above 0°C, acyl fluoride groups are obtained; (3) between 0°C and ambient temperatures, it appears that both chain extension and acyl fluoride groups result; (4) at ambient temperature and above, there are acyl fluoride groups present and as the reaction time increases to over one day and temperature further increases, chain scission is evident. Thus, it appears that at higher temperatures and longer reaction times, the likelihood of chain scission is present with the degree of scission related to both of these reaction variables.

Polyether groupings are between 9.17 and 9.71μ region, but since the starting polymer also exhibits absorption at that region, therefore they are not characteristic peaks, while acyl fluoride at 5.3 μ is a characteristic peak. Perfluorovinyl at 5.6μ and perfluorovinylene $-CF=CF-$ at 5.8μ are also characteristic peaks. The presence of ether linkages is deduced from increase of molecular weight and lack of 5.3μ for

and 6.5μ for epoxide. The perfluoro-n-heptene-1 and $OF_2$ reaction is the model, where isolation and identification for (perfluoro-n-heptyl) ether can easily be accomplished by infrared spectra since it is lacking all the other possibilities of having $-CF=CF_2$ at $5.6\mu$, $$-\overset{O}{\underset{\|}{C}}-F$$

at $5.3\mu$ and molecular weight determination.

INSERTION OF FUNCTIONAL GROUPS ON POLYPERFLUOROBUTADIENE BACKBONE

As can be seen from the previous Table II, and as was pointed out with regard to its description, the same reaction can produce the chain extension of the polyperfluorobutadiene and/or terminal or pendant acyl fluoride groups. The main control in determining whether or not acyl fluoride groups are present is temperature. At lower temperatures, one will get chain extension, or as will be described, a copolymerization if a diolefin is used. At the higher temperatures up to 100°C there is the tendency to form acyl fluoride groups in accord with the following reaction:

$$RCF=CF_2 + OF_2 \rightarrow [RCF_2CF_2OF] \xrightarrow{-F_2} RCF_2\overset{O}{\underset{\|}{C}}F \qquad 5.$$

where R can be any monovalent organic radical which remains stable under the reaction conditions and can, for example, contain 1 to at least 100 carbon atoms. Thus R can be alkyl, aryl, alkaryl, alkenyl, aralkyl and the like. Preferably, R is perfluorinated.

As can be seen from the above reaction, a hypofluorite is formed as an intermediate. This hypofluorite is unstable and liberates fluorine to produce the resulting acyl fluoride group. Depending upon the position of the perfluorovinyl group which is reacted with the $OF_2$, acyl fluoride can be formed either pendant to a backbone, as a single terminal group, the end of a chain, or at both ends of a polymer when the polymer is terminated at each end with a perfluorovinyl grouping. The presence of the acyl fluoride groups is often desirable, since they present reactive sites that could be utilized for future cross-linking reactions, or for adding functional groups. Particularly, in accord with the herein invention, an acyl fluoride terminated polyperfluorobutadiene has been hydrolyzed to produce a carboxyl-containing polyperfluorobutadiene. This novel material is a castable and vulcanizable unsaturated perfluoropolymer between ambient to 100°C, depending upon the molecular weight distribution and its functionality.

It has been found that the carboxyl polyperfluorobutadiene will adhere tenaciously to all surfaces to which it is attached, including surface untreated polytetrafluoroethylene. Prior to the herein invention in order to provide a high bond strength between polytetrafluoroethylene to a substrate, the polytetrafluoroethylene surface had to be treated with treating agents, such as sodium-ammonia complex, sodium-naphthalene or alkali metal in a polycyclic carbon before adhesives were applied. The adhesives generally were epoxies or phenol formaldehyde types. Thus, these prior procedures have limited applications especially in the presence of strong oxidizers and very reactive chemicals. The adherence of the carboxyl polyperfluorobutadiene to the surface of untreated Teflon is believed due to the improved wettability of the new polymer arising from the chemical structure and its gum nature.

Additionally, the improved bonding is believed to result from the carboxyl groups present together with olefinic bonds in the polymer. It has been found that the carboxyl polyperfluorobutadiene formed will adhere to surfaces at temperatures as low as −40°C. The formation of the carboxyl polyperfluorobutadiene can be seen from the following exemplary equation:

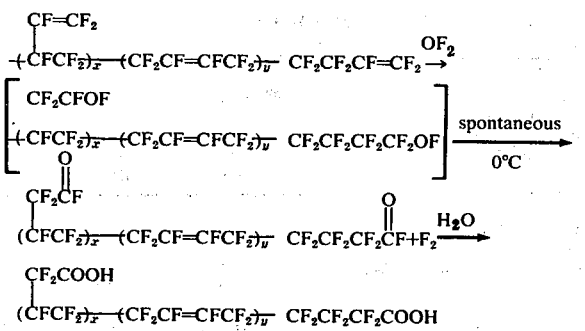

6.

It should be noted that for chain extension to high molecular weight, a stirred suspension of the starting polymer with $OF_2$ in flow state at 0°C and lower are preferred reaction conditions. To obtain acyl fluoride groups as well as chain extension of not too high molecular weight, the polymer can be either in solid state or suspension in Freon 113 or the like.

EXAMPLE III

CARBOXYL POLYPERFLUOROBUTADIENE

A solution of 6 grams of a polyperfluorobutadiene having $[\eta]$.045 dl/g and molecular weight of 13,000 was dissolved in hexafluorobenzene to form a solution. The solution was then freeze-dried in a Pyrex pressure bottle. The bottle containing the freeze-dried polymer was connected to a stainless steel vacuum system and evacuated at 50°C for one hour, and cooled to ambient temperature. Gaseous oxygen difluoride was introduced into the bottle, after having been passed through a sodium fluoride scrubber. The gaseous oxygen difluoride was introduced slowly to 2 atmospheres as initial pressure in the bottle for 48 hours. The bottle containing the freeze-dried polymer was maintained at 50°C during the contact with the gaseous oxygen difluoride. At the end of the 48 hour period the bottle was then evacuated of gaseous $OF_2$. The resulting gum formed had a $[\eta]$ of 0.035 dl/g and molecular weight of 9,000. The gum was hygroscopic. A partially soluble suspension of the gum product in Freon 113 was stirred with distilled water, and an emulsion was formed. Separation of the gum was achieved after removal of the Freon 113 by evaporation. The infrared spectrum clearly indicated that a carboxyl polyperfluorobutadiene was formed by a very strong broad band between 7.5 and 9.1$\mu$ region for C-F absorption, a peak at 5.65$\mu$ for carbonyl and a broad peak at 3.0$\mu$ for hydroxyl group. The gum was an adhesive material that was found to stick tenaciously to all surfaces on which it had been tried.

EXAMPLE IV

BONDING POLYTETRAFLUOROETHYLENE

The carboxyl polyperfluorobutadiene of Example III was used to bond two pieces of untreated polytetrafluoroethylene for tensile strength measurement. Tensile strength value of 169 psi at $-25°C$ was obtained between 1×1 inch squares of untreated polytetrafluoroethylene. Additionally, a composite was formed of aluminum-adhesive-polytetrafluoroethylene sheet-adhesive-aluminum for lap shear strength measurement. The piece parted in the bulk of the adhesive due to cohesive failure. There was no parting of adhesive-Teflon or adhesive- metal interface.

ADDITION COPOLYMERIZATION $OF_2$ can be utilized as a monomer in a copolymerization with a perfulorinated diolefin having terminal or pendant unsaturated groups. The reaction between the $OF_2$ and the diolefin is essentially the same mechanism as in the chain extension described above. However, in the copolymerization reaction as seen in reaction 3 above an ether linkage is formed between each repeating unit.

The copolymerization reaction to form a polymer having ether linkages to bond the monomers together in a chain is obtained only at lower temperatures, preferably below 0°C. As the temperature increases above 0°C, the following reaction will also occur where acyl fluoride groups are produced.

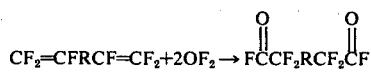   7.

As previously indicated, in addition to forming acyl fluoride groups, epoxide groups such as

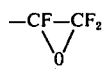

are also formed at increasing temperatures. At, for example, 15°C both ether linkages, epoxide linkages and acyl fluoride groups are formed. As can be appreciated, the presence of either the epoxide or the acyl fluoride groups prevent a long chain polymer of the perfluoroalkylene oxide type from forming. However, both of these groups are useful for further cross linking reactions. For example, when a reaction carried out at ambient temperature of 25°C between $OF_2$ and perfluorobutadiene for 5 days, only an acyl fluoride terminated product was obtained, having a low molecular weight. Such a product, however, is valuable, since the acyl fluoride groups can be irradiated by ultraviolet light to give higher molecular weight products. The higher molecular weight products or longer chain polymers can then be further cross linked utilizing an amine or peroxide type catalyst.

Normally the starting monomer materials are often in gaseous form. For example, perfluorobutadiene is a gas at ambient conditions. The reaction, however, is preferably carried out by condensing the gaseous monomer in a cold reactor sufficient to maintain it in a liquid state. The $OF_2$ can then be either bubbled through the liquefied monomer in an inert solvent such as Freon 113 or maintained in contact therewith under static conditions in the manner previously described. Polymerization can be readily noticed by obtaining either a solid precipitate which remains solid at ambient conditions, or a viscous oil which once again maintains that consistency under ambient conditions. The following example describes the preparation of a copolymer.

EXAMPLE V

ADDITION COPOLYMERIZATION OF PERFLUOROBUTADIENE AND OXYGEN DIFLUORIDE 10 mmoles of perfluorobutadiene was condensed into a Pyrex reaction tube through a stainless steel vacuum line which had been calibrated and passivated. Then 10 mmoles of gaseous oxygen difluoride which had been passed through a sodium fluoride scrubber was brought into contact with the liquid perfluorobutadiene at $-78°C$ maintained by a Dry Ice-Freon 11 bath. The $OF_2$ was allowed to remain in the reaction vessel for three hours at the aforegoing temperature. This was then followed by adding an additional 20 mmoles of $OF_2$ into the vapor phase. The vessel was then maintained at the $-78°C$ temperature for an additional 2 hours. The addition of $OF_2$ in increments is mainly for safety purposes. This approach additionally gives less side products. At the end of this additional 2-hour exposure to the $OF_2$, the mixture was cooled to $-78°$ by a Dry Ice-Freon 11 bath and the reaction tube then evacuated for 12 minutes to remove $OF_2$ in the system. This was followed by cooling to $-196°C$ by liquid nitrogen bath and evacuated for 20 minutes, before the reaction tube was vacuum sealed and brought to ambient temperature. A precipitation of a white polymer was observed in an hour at the ambient temperature. The white solid polymer had a melting point of $137°-167°C$ and was insoluble in hexafluorobenzene. The infrared spectrum of the white solid polymer had a strong broad peak between 7.4 and 9.0$\mu$ indicating C-F absorption, and two strong bands at 9.21$\mu$ and 9.70$\mu$ which can be assigned to perfluorinated ether.

EXAMPLE VI

ADDITION COPOLYMERIZATION OF PERFLUOROBUTADIENE AND $OF_2$ 1 ml of perfluorobutadiene was condensed into an evacuated Pyrex reaction tube containing a magnetic stirring rod. The temperature of the tube at the time of condensation was $-78°C$ and was maintained by a Dry Ice-Freon 11 bath. The tube was connected to a stainless steel manifold. After the condensation of the perfluorobutadiene the valve above the tube was closed and gaseous $OF_2$ which had passed through a sodium fluoride scrubber was introduced into the evacuated manifold to ⅓ atmosphere before the valve above the reaction tube was opened. The initial pressure was recorded after the reaction tube was exposed to $OF_2$ at the −70°C under stirring, warmed slowly to 0°C for a period of thirty minutes and maintained at 0°C for thirty minutes before warming to ambient temperature. A pressure drop of 1/6 atmosphere was observed after cooling the tube back to −70°C.

The OF$_2$ addition to 1/3 atmosphere, followed by the same warming up steps, was repeated three times except before the last OF$_2$ addition, the manifold was evacuated after cooling the reaction tube to −70°C. After the three additions, the reaction mixture was then left stirring at ambient temperature overnight before evacuation after cooling the reaction tube to −70°C. This was then followed by a further addition of 1 milliliter of perfluorobutadiene into the reaction mixture and stirring for 2 hours at 20°C. The further addition was done for two reasons: (1) to eliminate the presence of fluoroxy groups for safety, and (2) to attempt to replace each fluoroxy group with a perfluorovinyl termination. Upon fractionation of the mixture, the last fraction, which was a residual liquid, did not boil at 20°C under 1 mmHg pressure.

The infrared spectrum of this product had characteristic strong broad peak at 7.4 to 9.5$\mu$ for C-F absorption, strong 5.65$\mu$ peak for carbonyl

absorption and a broad peak from 2.8$\mu$ to 3.7$\mu$ for a hydroxyl group (—OH). The spectrum was almost identical with a previously made and described acid carboxylic terminated poly(perfluorotetramethylene oxide). This prior described product, however, was synthesized by an entirely different procedure, utilizing a photopolymerization of perfluorooxydipropionyl fluoride.

It can be concluded from the above examples that a low temperature at or below 0°C is essential for higher molecular weight copolymer because the formation of acyl fluoride groups at the terminal ends means that the copolymerization reaction of OF$_2$ and perfluorodiene stops.

GRAFT COPOLYMERIZATION UTILIZING OXYGEN DIFLUORIDE

As disclosed in U.S. patent application Ser. No. 810,815 filed Mar. 26, 1969, there is disclosed a method of treating polyperfluoropolyenes to provide radical reactive sites which comprises exposing the polyperfloropolyene to a source of fluorine gas to create free radical sites. This enables one to attach monomers to the free radical sites on the polyperfluoropolyene. In other words, the procedure of creating the free radical sites as disclosed in copending application allows one to graft monomers onto a polymer backbone.

As shown in the above Reaction 4, fluorine is generated in situ when a hypofluorite group which is formed upon contact of a perfluoropolyene with OF$_2$ degenerates to an acyl fluoride or epoxide grouping. This generation of fluorine can serve, as in the copending case, to create free radical sites on the polymer backbone which can then be susceptible sites for grafting of monomers. One advantage of the herein technique of utilizing OF$_2$ is that grafting can be achieved while concurrently obtaining a chain extension of the basic polymer material. Further, acyl fluoride and/or epoxide groups are obtained as a product of the grafting, which groups are more susceptible to further crosslinking reactions as has been previously indicated. The graft polymerization can occur by concurrently mixing fluoroxy-containing polyperfluoropolyene as result of reaction of the perfluoropolyene and OF$_2$ and monomeric material together.

Alternatively, the polyene can be initially contacted with the OF$_2$ generating the free radical sites. The free radical sites so generated on a fluorinated polyene are highly stable and thus can be subsequently reacted with a monomer to achieve the desired grafting. The temperature conditions under which the grafting occurs will affect the length of polymer chain. Generally the reaction should be carried out above 0°C, since, as indicated above, this is required in order to generate fluorine from the hypofluorite groups. The closer the temperature is to 0°C, the longer the resulting polymer chain. As the temperatures go higher, up to for example 100°C, the chains become shorter, maintaining the same length as the original starting polyene and eventually, at the higher temperatures, chain scission will occur, thus obtaining a low molecular weight material. For example, at 50°C, chain scission has been observed in perfluorobutadiene. The following examples indicate the grafting of monomers onto polyperfluorobutadiene.

EXAMPLE VII

GRAFT POLYMERIZATION OF TETRAFLUOROETHYLENE TO POLYPERFLUOROBUTADIENE

A hexafluorobenzene solution containing 0.346 grams of a polyperfluorobutadiene having a melting point of 102°–130°C containing both 1,2 and 1,4-butadiene groups was freeze-dried in a borosilicate glass tube. The tube was then evacuated at 50°C and then cooled to −80°C prior to introducing gaseous oxygen difluoride. The oxygen difluoride which had been passed through a sodium fluoride scrubber was admitted into the glass tube to a 1/6 atmosphere pressure. The tube was then warmed to 0°C and kept at the 1/6 atmosphere. It was further warmed from 0°C to 15°C over a ten minute period, at the same pressure. Then the tube was evacuated. Tetrafluoroethylene which had been passed through a silica gel column to remove a terpene inhibitor was introduced into the tube 1-1/3 atmosphere at 15°C. A very slight pressure drop was observed at the end of 15 minutes before evacuation. A white remaining resin was evacuated at 50°C overnight and weighed 0.349 grams, having a melting point of 130°–147°C. The infrared spectrum of the resin was almost identical to the starting polymer except with a definite decrease in the 5.6$\mu$ peak. This decrease in the presence of the perfluorovinyl groupings indicated that the preference of OF$_2$ addition is to perfluorovinyl groups of PPFB and also that the product, which is fluoroxy-containing PPFB, is an intermediate to react with another perfluorovinyl group of PPFB.

The same procedure was repeated between polyperfluorobutadiene and tetrafluoroethylene, varying conditions of the reaction. The results are summarized in the Table III below. As can be seen from the table, when the gaseous OF$_2$ exposure was carried out at 100°C and longer exposure time, the infrared spectrum of the product shows disappearance of the 5.8$\mu$ band and the appearance of 5.3$\mu$, indicating the presence of acyl fluoride groups.

TABLE III

GRAFT COPOLYMERIZATION OF PERPERFLUOROBUTADIENE-TETRAFLUOROETHYLENE BY MEANS OF $OF_2$

| Starting Polymer | Static Exposure to $OF_2$ | | | Static Exposure to $C_2F_4$ | | | Product Relative Infrared Peaks to Starting Polymer | | | Wt. Change (%) | Tm (°C) |
|---|---|---|---|---|---|---|---|---|---|---|---|
| | Pres. (atm.) | Temp. (°C) | Time (min) | Pres. (atm.) | Temp. (°C) | Time (min) | $5.3\mu$ $\overset{O}{\underset{\|}{-C-F}}$ | $5.6\mu$ $-CF=CF_2$ | $5.8\mu$ $-CF=CF-$ | | |
| Freeze-Dried PPFB (Tm 102–130°C) | 1/6 | 0 | 10 | 1⅓ | 0 | 15 | | Decrease | Same | +0.9 | 130–147 |
| Freeze-Dried PPFB (Tm 138–159) | 1 | 0 | 30 | 1⅓ | 25 | 15 | | Decrease | Same | 0 | |
| Freeze-Dried PPFB (Tm 138–159) | 2 | 100 | 60 | 2⅓ | 0 | 35 | New | Decrease | Disappear | +14.7 | 175–207 |

EXAMPLE VIII

GRAFT COPOLYMERIZATION OF POLYPERFLUOROBUTADIENE AND HEXAFLUOROPROPYLENE EPOXIDE AND POLYPERFLUOROBUTADIENE-PERFLUOROBUTADIENE

The procedure described in Example VII above was followed except under different $OF_2$ conditions. The monomer, either hexafluoropropylene epoxide or perfluorobutadiene, was condensed into the reaction tube and vacuum sealed. The sealed reaction tube was kept at room temperature for three months after the initial reaction conditions. The unreacted monomer was then discharged into another tube through a vacuum system after cooling the tube. A three-month period was selected because of the general slow rate of polymerization of fluoromonomers such as hexafluoropropylene oxide and perfluorobutadiene in the presence of free radicals. In each instance a white resin which remained was evacuated at 50°C overnight. The results and experimental conditions are summarized in Table IV below.

lowers the melting point. Such a low melting point at a 100°C exposure cannot be attributed to chain scission alone. Rather, it is apparent that a modification of the polymers results. The grafting with perfluorobutadiene increased the molecular weight of the starting material since the grafted monomer is of the same species.

I claim:

1. A method of modifying a polyperfluoro-1,2 and 1,4 butadiene polymer containing a high percentage of pendant 1,2-perfluoro vinyl groups and being prepared by the free radical polymerization of perfluorobutadiene by a gaseous perfluoroalkyl peroxide catalyst, said polymer consisting essentially of units of the formula:

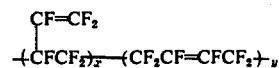

where
x and y are integers such that the molecular weight is at least 25,000 comprising the step of:
reacting said polymer with oxygen difluoride at a temperature of no less than 25°C to form a polymer

TABLE IV

GRAFT COPOLYMERIZATIONS OF POLYPERFLUOROBUTADIENE-HEXAFLUOROPROPYLENE EPOXIDE AND -PERFLUOROBUTADIENE

| Graft Copolymer | Starting Polymer | Static Exposure to $OF_2$ | | | Product Relative Infrared Peaks to Starting Polymer | | | Tm (°C) |
|---|---|---|---|---|---|---|---|---|
| | | Pres. (atm.) | Temp. (°C) | Time (min) | $5.3\mu$ $\overset{O}{\underset{\|}{-C-F}}$ | $5.6\mu$ $-CF=CF_2$ | $5.8\mu$ $-CF=CF-$ | |
| Polyperfluorobutadiene-Hexafluoropropylene Epoxide | Freeze-Dried solid PPFB (Tm 138–159°C) | 1 | 25 | 60 | | Slight decrease | Slight decrease | 90–105 |
| | " | 1 | 100 | 90 | New | Slight decrease | Disappear | <50 |
| Polyperfluorobutadiene-Perfluorobutadiene | Freeze-Dried solid PPFB (Tm 50°C) | 1 | 17 | 60 | | Slight decrease | Slight decrease | 137–150 |
| | " | 1 | 55 | 60 | New | Slight decrease | Slight decrease | 139–148 |

As seen from Table IV graft copolymerization with hexafluoropropylene modified the starting polymer as indicated by the decrease in melting point. At 100°C a new peak for acyl fluoride appears which, with apparent chain scission at this temperature, significantly containing acyl groups of the formula:

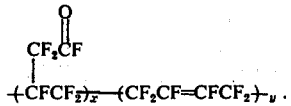

2. The method of claim 1 wherein said polymer prepared by said free radical polymerization reaction is solid at ambient conditions and further comprising:
forming a dispersion of particles of said solid polymer in an inert liquid,
and contacting said $OF_2$ with said dispersion.

3. The method of claim 2 comprising:
continuously bubbling said $OF_2$ through said liquid dispersion to form said resulting groups.

4. A method according to claim 1 further including the step of hydrolyzing said acyl groups to form a carboxyl-containing group of the formula:

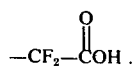

5. An acylated polyperfluoro-1,2 and 1,4 butadiene polymer from a polyperfluoro-1,2 and 1,4 butadiene polymer containing a high percentage of pendant 1,2-perfluoro vinyl groups, said last mentioned polymer being prepared by the free radical polymerization of perfluorobutadiene by a gaseous perfluoroalkyl peroxide catalyst, said acylated polymer consisting of units of the formula:

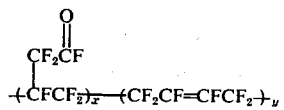

where $x$ and $y$ are positive integers such that the molecular weight is at least 25,000.

6. A carboxyl substituted polyperfluoro-1,2 and 1,4 butadiene polymer from a polyperfluoro-1,2 and 1,4 butadiene polymer containing a high percentage of pendant 1,2-perfluoro vinyl groups, said last mentioned polymer being prepared by the free radical polymerization of perfluorobutadiene by a gaseous perfluoroalkyl peroxide catalyst, said carboxyl substituted polymer consisting of units of the formula:

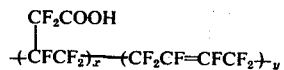

where $x$ and $y$ are positive integers such that the molecular weight is at least 25,000.

* * * * *